DYNAMIC TAPE SKEW CORRECTION

Filed June 22, 1966 2 Sheets-Sheet 1

INVENTOR.
WALTER GYSLING
BY Thomas J. Devine
ATTORNEY

May 28, 1968 W. GYSLING 3,385,496

DYNAMIC TAPE SKEW CORRECTION

Filed June 22, 1966 2 Sheets-Sheet 2

INVENTOR.
WALTER GYSLING
BY Thomas G. Devine
ATTORNEY

United States Patent Office 3,385,496
Patented May 28, 1968

3,385,496

DYNAMIC TAPE SKEW CORRECTION

Walter Gysling, Minneapolis, Minn., assignor to Control Data Corporation, Minneapolis, Minn., a corporation of Minnesota Filed June 22, 1966, Ser. No. 559,453
2 Claims. (Cl. 226—177)

The present invention relates to an improved adjustable pinch roller assembly operating in conjunction with a driving capstan to propel a strip or band, such as magnetic tape, along a predetermined path without the occurrence of tape skew. The improved pinch roller assembly involved in this invention enables the adjustment of tape skew to be made while the tape is in motion.

A common problem that occurs in any pinch roller and capstan drive arrangement is that tape will be forced to drift out of the path prescribed for the tape unless the pinch roller and the capstan are properly aligned, both in plane tangent to the pinch roller periphery and the capstan periphery at the nip or engagement point between these two peripheries and also in a plane normal to the aforesaid parallel plane. The precise capstan and pinch roller alignment in the plane tangent to the peripheries of both the pinch roller and capstan requires an initial adjustment and later readjustments, as the mechanical components wear, to continue skew elimination. The alignment in a normal plane may be set, however, without a later readjustment since a slight misalignment in this plane does not cause significant tape skew.

Prior techniques for adjusting the pinch roller consist of methods that either interact so that an adjustment in the tangential plane effects the adjustment in the normal plane and adjustment of skew can only be made accurately with the machine shutdown. A unique aspect of this invention involves a device for adjusting the position of the pinch roller in a plane tangent to the two peripheries at the nip point and for independently adjusting the pinch roller in a direction normal to said plane, such adjustments being simple and capable of being performed while the tape is in motion. In this described embodiment a cam adjusts the pinch roller in the tangential plane by rotation about its axis and an independent adjusting screw adjusts the pinch roller in the normal direction by movement of the main shaft end attached to the rear pinch roller support means and thereby allowing the shaft to tilt around the front support bearing. Skew adjustments made on a machine employing the present invention may be accomplished while the tape is under motion due to the simplicity and independence of the adjustments.

It is an object of this invention to provide an adjusting means for a pinch roller operating in conjunction with a capstan so that the position of the pinch roller may be adjusted in a plane tangential to the nip of the capstan and the pinch roller independently of the adjustment made in a plane normal to said tangential plane.

It is a further object of this invention to provide a device capable of providing the aforesaid independent adjustment simply and accurately while the tape is under motion.

It is a further object of this invention to provide a pinch roller adjusting device capable of adjusting the pinch roller independently of the capstan to eliminate tape skew in a tape transport.

The invention and further embodiments may become apparent in the following diagrams:

Figure 1:
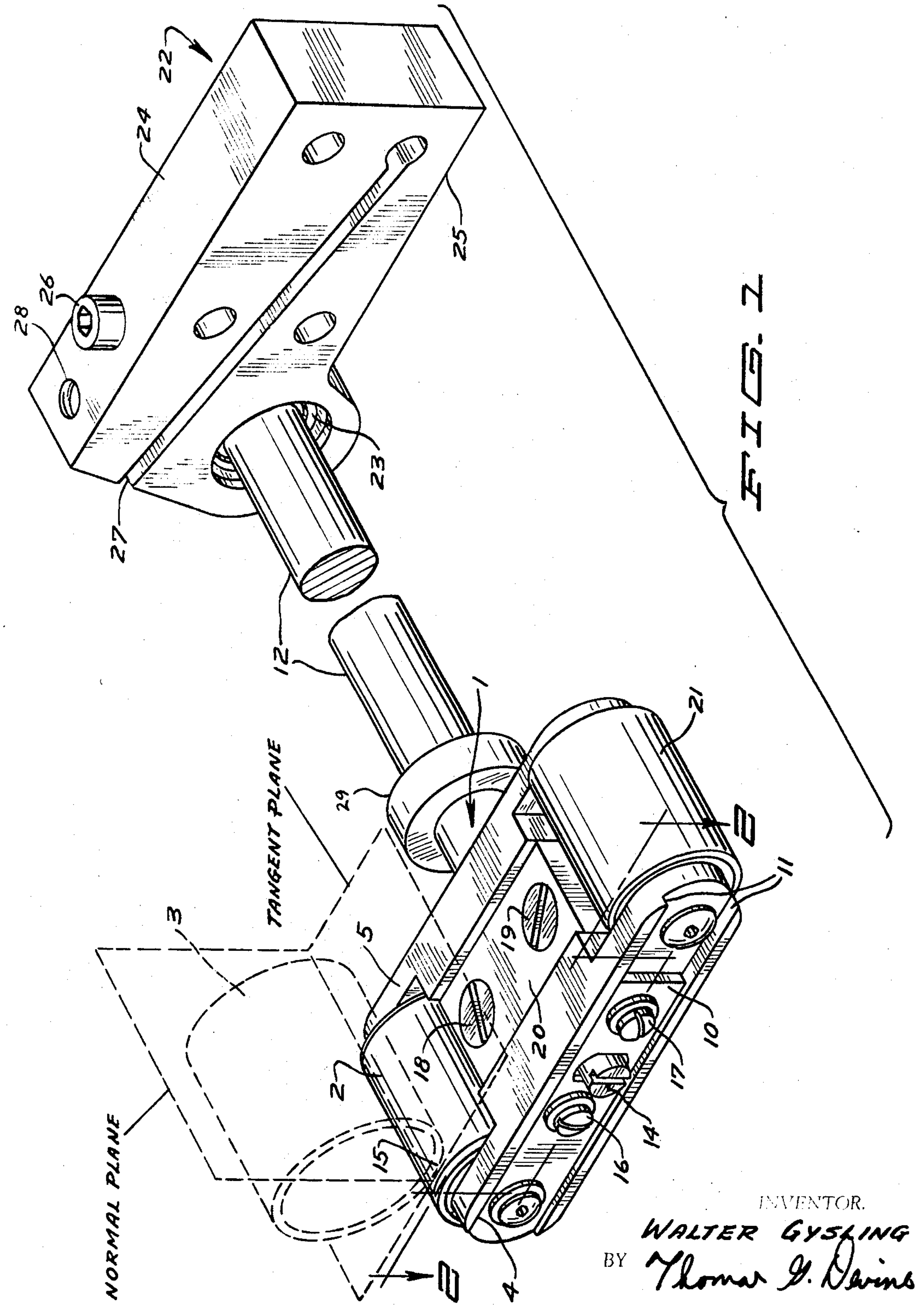
FIGURE 1 is a perspective view showing the capstan, pinch roller assembly, main shaft, and support block containing the shaft adjusting screws.

Referring to FIGURE 1, the pinch roller support is noted generally as 1. Pinch roller 2 associated with drive capstan 3 is supported at the ends of its axis of rotation by arms 4 and 5.

Figure 2:
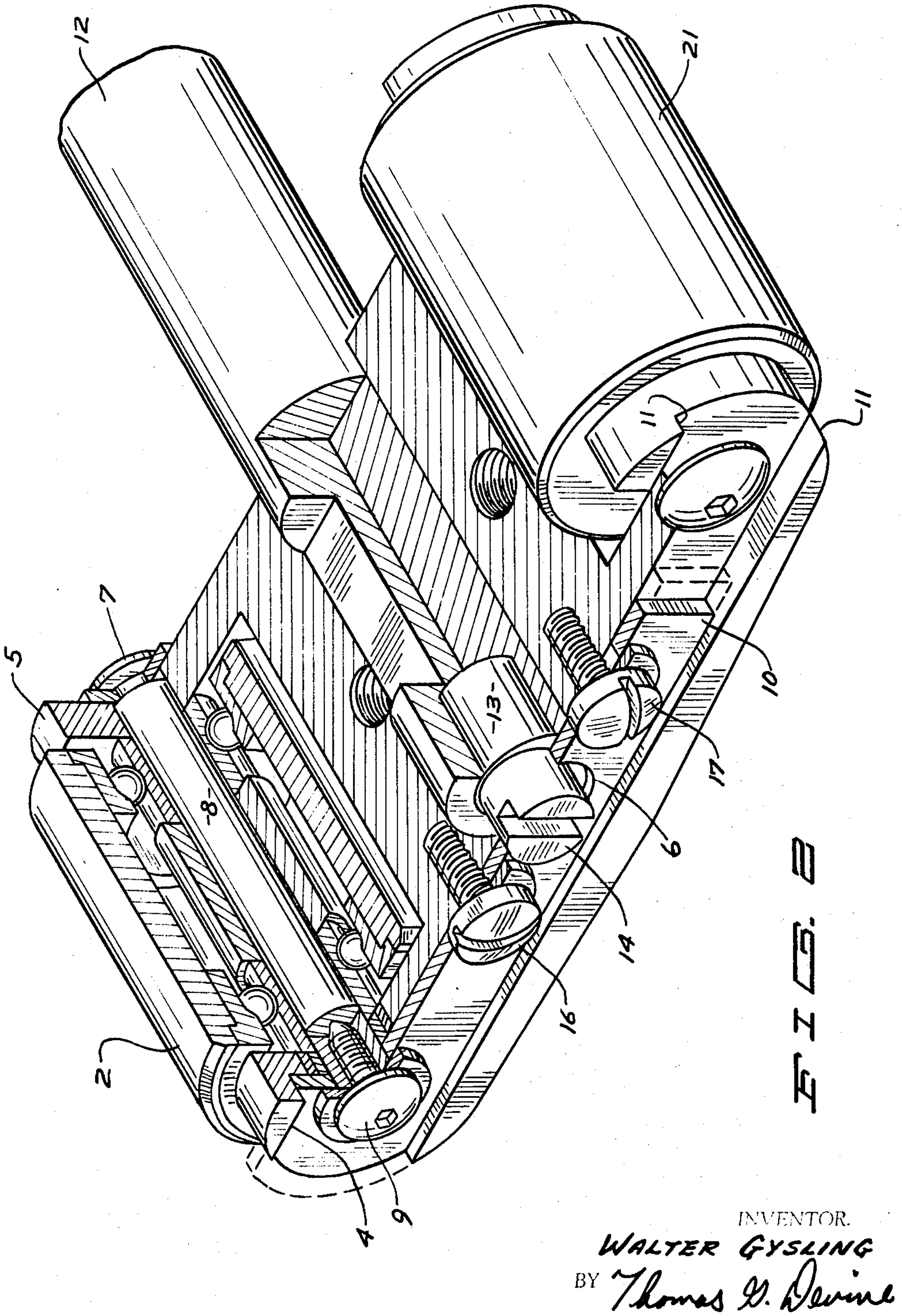
FIGURE 2 shows the perspective view of the pinch roller assembly exposed by cutting plane 2—2.

In FIGURE 2, screw 7 secures the rear end of the pinch roller shaft 8 at a fixed point on arm 5. The other end of the pinch roller shaft 8 is secured by screw 9 to the slider 10 that rides in the slide channel 11 and is secured by lock screws 16 and 17. The shaft 12 carries a cylinder 13 and its outer eccentric end 14, referred to as the cam, which extends through hole 6 in the slider 10 so that as the cam is rotated about its axis of revolution, the cam 14 bears on the inner surface of the hole 6 causing the slider 10 to slide back and forth in channel 11 when lockscrews 16 and 17 are loosened, thereby varying the orientation of the pinch roller shaft 8 with respect to the capstan in a plane tangential to the nip or engagement point 15 (shown on FIGURE 1). Lock screws 16 and 17 allow clamping of the slider 10 in place after adjustment is completed. It is apparent that a slider could be employed at either or both ends of the pinch roller shaft to provide adjustment of either or both ends if desired.

Referring again to FIGURE 1, screws 18 and 19 act to lock plate 20 in place to secure shaft 12 to the support 1. An additional roller such as 21 may be secured to the pinch roller assembly if desired.

Shaft 12 is secured in bearing plate 22 by rear bearing 23 and rigidly secured front support bearing 29 which allow the shaft to rotate. Bearing plate 22 is composed of a fixed portion 24 and a flexible portion 25. The fixed portion 24 is rigidly secured and the position of the end of the shaft 12 in bearing plate 22 is varied according to the spacing of groove 27 which is controlled by position screw 26 and 28. Rotating screw 26 clockwise will decrease spacing of groove 27. Rotating set screw 28 clockwise will increase spacing of groove 27. After adjustment, both screws 26 and 28 can be locked against each other to prevent self loosening. The rotation of screws 26 and 28 thereby adjusts the pinch roller assembly in the normal plane by moving shaft 12 in the normal plane. Rotation of cam 14 enables a skew adjustment to be made in the tangent plane which is independent of the adjustment in the normal plane.

The present invention allows tape skew elimination adjustments to be made with the tape under motion. Several information tracks may be recorded on the tape and tape skew may be detected by use of an electronic oscilloscope or other display device showing the resulting time displacement between the signals recovered from the various tracks. The signal time displacement between any two tracks, preferably the two most distant tracks may be used as a measure of the magnitude of the prevailing tape skew and may be reduced to a minimum under continuous signal display by the adjustment of the pinch roller described. The simplicity and independence of the tangent and normal plane adjustments in described invention allows dynamic tape skew correction to be made efficiently and accurately in a minimum amount of time even with the tape in motion.

The following claims are intended to cover all changes and modifications falling within the spirit and scope of the described invention. It will be obvious to those skilled in the art that many modifications of the present invention may be made without departing from the scope and spirit of the invention.

What is claimed is:

1. A tape transport apparatus for directing moving tape in a positive path past a capstan, comprising:

(a) a rotatable roller having a periphery adapted to form a nip with the periphery of the capstan such that tape passes between the capstan and the roller at the nip, the roller having first and second ends located at opposite ends of the axis of rotation of the roller, (b) a support means having first and second arms, the first arm rotatably connected to the first end of the roller at a first support point located at the first end of the roller, (c) a sliding member slidably engaged by the second arm, said sliding member rotatably connected to the second end of the roller at a second support located at the opposite end of the axis of rotation of the roller, the sliding member disposed to control the relative location of the second support point with respect to the first support point in a plane tangent to the peripheries of both the capstan and the roller at the nip, (d) a first adjusting means operatively connected to the sliding member to adjust the relative location of the second support point with respect to the first support point in the tangent plane, (e) a second adjusting means operatively connected to the support means to independently adjust the location of the support points in a plane normal to a tangent to the peripheries of both the capstan and the roller at the nip.

2. A device as in claim 1 wherein, (a) the first adjusting means is a rotatable eccentric cam contacting the slidably engaged member during rotation of the cam about its central axis to adjust the relative location of the second support point with respect to the first support point in the tangent plane, and, (b) the second adjusting means is a shaft having one end secured to the support means, the other end being free to move to independently adjust the location of the support points in the normal plane.

References Cited

UNITED STATES PATENTS 3,233,807 2/1966 Wray -------------- 226—180

ALLEN N. KNOWLES, *Primary Examiner.*